(12) United States Patent
Maguire et al.

(10) Patent No.: US 8,036,785 B2
(45) Date of Patent: Oct. 11, 2011

(54) HYBRID VEHICLE POWERTRAIN CONTROL METHOD

(75) Inventors: Joel M. Maguire, Northville, MI (US); Madhusudan Raghavan, West Bloomfield, MI (US); Robert P. Roesser, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 195 days.

(21) Appl. No.: 12/408,762

(22) Filed: Mar. 23, 2009

(65) Prior Publication Data

US 2009/0182463 A1 Jul. 16, 2009

Related U.S. Application Data

(62) Division of application No. 11/681,800, filed on Mar. 5, 2007, now Pat. No. 7,539,562.

(51) Int. Cl.
*G05D 3/00* (2006.01)
(52) U.S. Cl. .......................... 701/22; 701/123
(58) Field of Classification Search .............. 701/22, 701/123; 180/65.4, 65.8; 903/921, 903
See application file for complete search history.

(56) References Cited

U.S. PATENT DOCUMENTS

| | | | | |
|---|---|---|---|---|
| 5,815,824 A | * | 9/1998 | Saga et al. | 701/22 |
| 6,487,477 B1 | * | 11/2002 | Woestman et al. | 701/22 |
| 6,837,321 B2 | * | 1/2005 | Ovshinsky et al. | 180/65.245 |
| 6,856,866 B2 | * | 2/2005 | Nakao | 701/22 |

FOREIGN PATENT DOCUMENTS

| | | |
|---|---|---|
| CN | 1498335 A | 5/2004 |
| WO | 02060157 A2 | 8/2002 |

\* cited by examiner

*Primary Examiner* — Mark Hellner
(74) *Attorney, Agent, or Firm* — Quinn Law Group, PLLC

(57) ABSTRACT

A method for controlling a powertrain of a hybrid vehicle having an engine, a motor/generator, a battery that is rechargeable using at least one of the engine and the motor/generator, and a powertrain control module (PCM) includes determining a current location of the vehicle as a starting point of a preferred route, recording a user-selected ending point of the preferred route, and processing route information using the PCM to thereby determine an optimally fuel efficient route for reaching the ending point. The method includes automatically executing the powertrain control strategy over the optimally fuel efficient route by substantially depleting a charge level of the battery as the vehicle travels over the optimally fuel efficient route such that the charge level of the battery is depleted when the vehicle reaches the ending point. When the ending point is not recorded, the PCM can default to a charge-sustaining mode.

13 Claims, 2 Drawing Sheets

HYBRID VEHICLE POWERTRAIN CONTROL METHOD

CROSS-REFERENCE TO RELATED APPLICATIONS

This application claims the benefit of U.S. Provisional Application No. 60/779,602, filed Mar. 6, 2006, and is a divisional application of U.S. patent application Ser. No. 11/681,800, filed on Mar. 5, 2007, both of which are hereby incorporated by reference in their entireties, and to which priority is claimed herein.

TECHNICAL FIELD

The present invention pertains generally to a hybrid vehicle having a control method for improving fuel efficiency of the vehicle, and more particularly to a method for determining an optimal energy management strategy for maximizing the fuel economy of a hybrid vehicle operating in a charge-depleting mode.

BACKGROUND OF THE INVENTION

Conventional hybrid vehicles are powered by an engine and one or more electric motor/generators, which in turn may be powered or energized by a rechargeable battery. In a charge-depleting mode, the battery is slowly allowed to discharge or drop to a threshold minimum charge level over the course of travel, and may be recharged, for example, by using available energy from the engine output, the motor/generator, and/or by plugging the battery into an available energy source, such as an electrical outlet, when the vehicle reaches its destination.

During hybrid vehicle operation, a control method typically selects a preferred power source or combination of power sources (i.e. the engine and/or one or more motor/generators) in order to power the hybrid vehicle in an optimally fuel efficient manner. The control method also monitors battery charge level and schedules battery recharging in order to ensure the motor/generators remain operational to drive the hybrid vehicle. The battery is maintained in a charge-deleting or charge-sustaining mode. In general, a battery enters a charge-depleting mode when a control method selects the motor/generator as the preferred power source, such as while the vehicle is accelerating from a standstill, and draws energy from the battery, thereby depleting the battery charge. In a charge-sustaining mode, the battery is maintained at a particular charge level, preserving or sustaining the battery charge level.

The efficiency of a given control method or algorithm in managing the selection and/or combination of available hybrid power sources is affected by various external factors. For example, the distance of a vehicle trip or route, route topography, and the frequency of braking over the course of the route, each influence the vehicle speed profile over that route. The ability to "look ahead" at a planned route in determining an optimal powertrain strategy may therefore help maximize fuel economy of the hybrid vehicle over the route.

SUMMARY OF THE INVENTION

Accordingly, a method is provided for controlling a hybrid vehicle powertrain having an engine, a motor/generator, a battery that is rechargeable using the engine and motor/generator, and a powertrain control module or PCM. The PCM is operable for developing a powertrain control strategy for powering the vehicle using at least one of the engine, motor/generator, and battery. The method can include determining a current location of the vehicle as a starting point of a preferred route, and recording a user-selected ending point of the preferred route. The PCM processes a set of route information to determine an optimally fuel efficient route for the vehicle, and then automatically executes the powertrain control strategy over this route. The strategy depletes a charge level of the battery as the vehicle travels over the route such that the battery is depleted when the vehicle arrives at the ending point.

The method can include receiving real-time traffic data and/or topographical information describing the topography of the optimally fuel efficient route as another set of route input data. The real-time traffic data can be continuously or periodically evaluated to update the optimally fuel efficient route and powertrain control strategy. The powertrain control strategy includes selectively powering the vehicle using the engine, with the engine powered via homogeneous charge compression ignition, port fuel injection, active fuel management, direct injection strategy, or variable compression ratio strategy according to various embodiments. The engine can be powered using ethanol, gasoline, dimethyl ether, or diesel fuel.

In an exemplary embodiment, the method can include determining the presence or absence of the preferred route, including the ending point of the preferred route, and selecting one of a charge-depleting or charge-sustaining powertrain control strategy based on whether the ending point is recorded. A charge-depleting strategy can be selected when a preferred route is determined, and a charge-sustaining strategy can be used as a default mode when a preferred route is not determined or when an ending point is not recorded.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
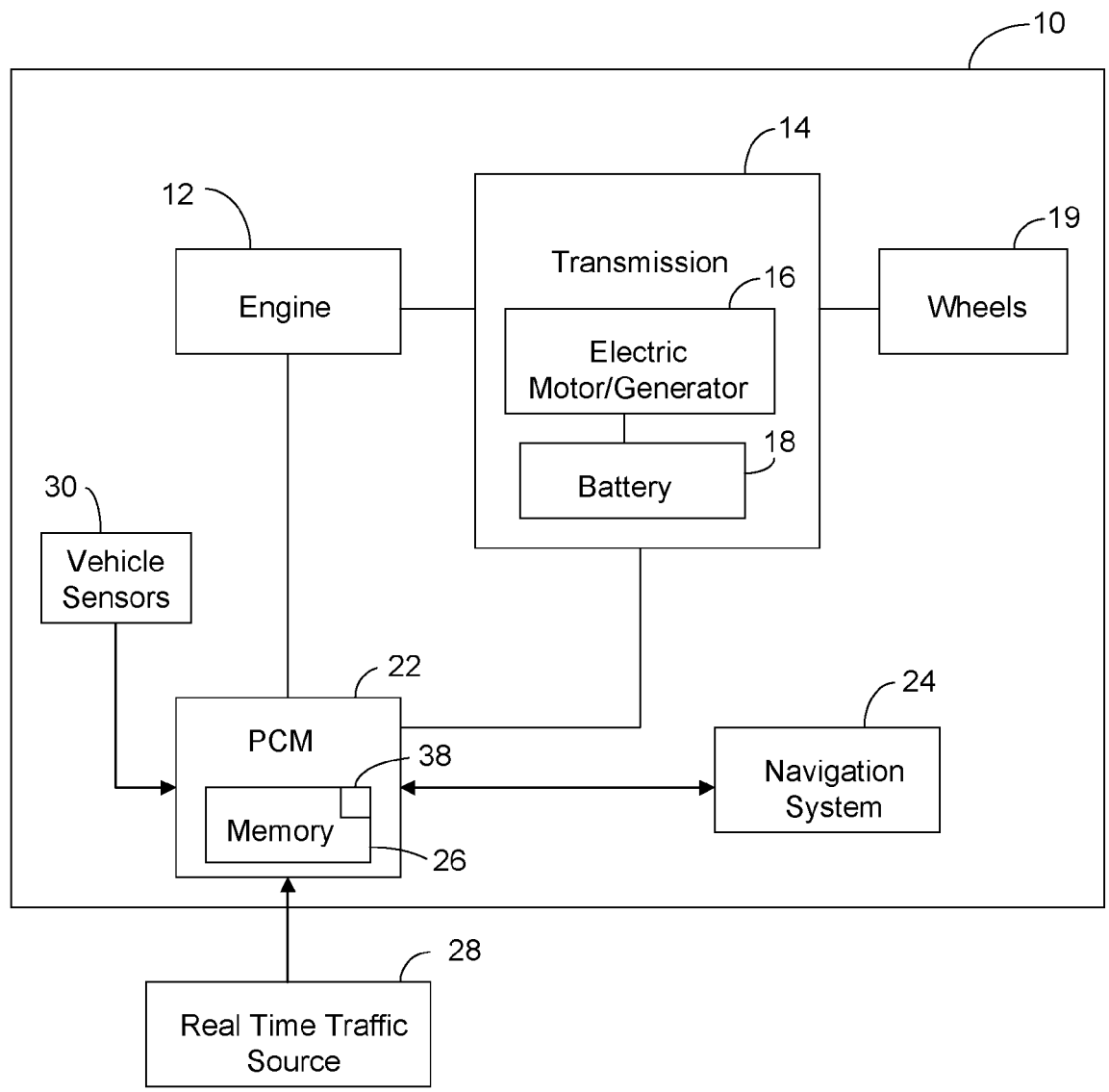
FIG. 1 is a schematic illustration of a hybrid vehicle in accordance with the present invention.

Referring to the drawings, wherein like reference numbers refer to like components, there is shown in FIG. 1 a schematic illustration of a hybrid vehicle 10 in accordance with the present invention. Hybrid vehicle 10 is shown for illustrative purposes, and alternate hybrid vehicle configurations may be envisioned within the scope of the invention. The hybrid vehicle 10 includes an engine 12 operatively connected to a transmission 14. The transmission 14 includes at least one electric motor/generator 16 that is powered by a rechargeable battery 18 when acting as a motor, and that is operable for recharging the battery 18 when operating as a generator. Transmission output or torque is transferred to the wheels 19 to thereby propel or drive the hybrid vehicle 10. A powertrain control module, or PCM, 22 is operatively connected to the engine 12 and transmission 14.

As the hybrid vehicle 10 is driven or operated, PCM 22 develops an optimal powertrain control strategy to power the hybrid vehicle 10 in an optimally fuel efficient manner. The powertrain control strategy may include, for example, a determination of when to run the engine 12 and the electric motor/generator 16, and/or when to charge the battery 18. As will be described in detail hereinafter, the PCM 22 includes a control method or algorithm 38 (see FIG. 2), as described hereinbelow, which is configured or programmed to "look ahead" and generate the powertrain control strategy and an optimal route for a particular trip. For purposes of the present invention, "look ahead" refers to the ability to anticipate future driving conditions or events.

In order to "look ahead", the PCM 22 is operatively connected to a vehicle navigation system 24. To initiate the method of the present invention, the operator manually inputs route input data for a preferred route into the navigation system 24 in the form of the starting and ending points of the route. The navigation system 24 can obtain the current location of the vehicle 10 using a global positioning system, or GPS, (not shown), or the current location can alternatively be manually input by the operator. Therefore, data identifying the starting point and ending point of a preferred route or trip is provided to the PCM 22.

The PCM 22 includes a memory device 26. An electronic map, such as those commercially available from TeleAtlas located in Southfield, Mich., is preferably stored in the memory device 26. Using the electronic map along with the starting point and ending point of a particular route or trip, the PCM 22 can select an optimal route. The determination of which route is optimal is preferably based primarily on vehicle fuel economy, however, other considerations may include, for example, the estimated time for the trip, the distance required for the trip, and/or traffic controls. The electronic map preferably includes elevation or topography information which may also be used in the selection of an optimal route. As an example, a shorter route having extreme elevation changes, such as hilly or mountainous topography, may require more fuel consumption than a longer route with generally constant or flat elevation.

The PCM 22 receives "look ahead" data in the form of real-time traffic information from one or more of a plurality of external sources 28. The real time traffic sources 28 may include, for example, an OnStar system, a satellite radio device, a vehicle-to-vehicle communication device, and/or a cellular phone connection. This real-time traffic data may be used by the PCM 22 in determining the optimal route. As an example, a shorter route having excessive traffic congestion may require the vehicle to accelerate and decelerate more frequently and thereby increase fuel consumption as compared to a longer route with less traffic, such that the longer route would be the optimal route.

The PCM 22 receives vehicle data from one or more of a plurality of vehicle sensors 30. The vehicle sensors 30 are configured or programmed to receive and/or monitor a variety of vehicle characteristics such as, for example, fuel level, remaining battery charge or current charge level, temperature, and/or speed, or other similar vehicle characteristics. This received or monitored sensor data is used to determine the powertrain control strategy. As an example, if the battery charge level is low, i.e. is less than or equal to a predetermined or threshold battery charge level, it may be necessary to operate the engine 12 in order to power the vehicle 10 and charge the battery 18 such that adequate vehicle performance is maintained.

Figure 2:
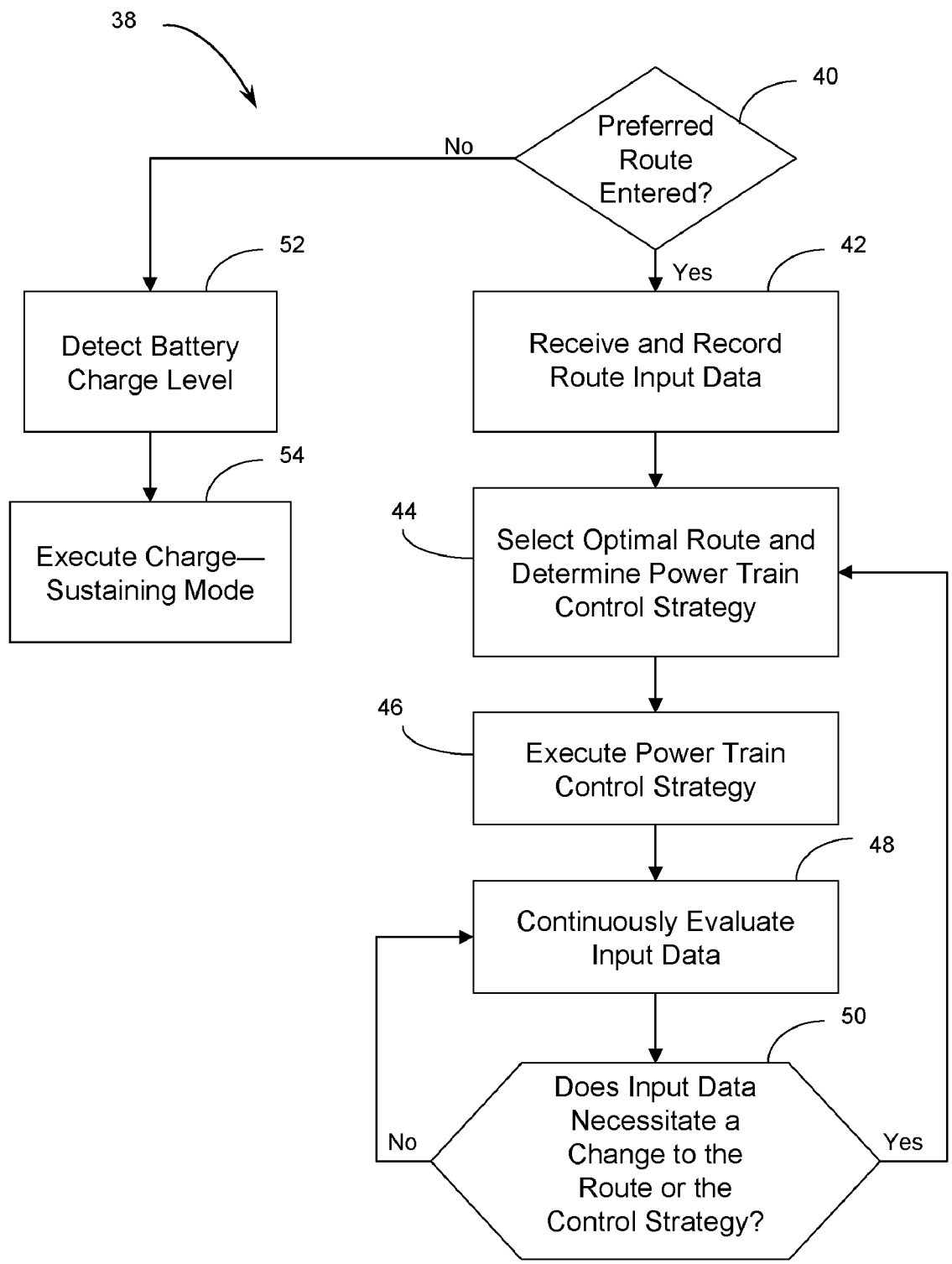
FIG. 2 is a flow chart illustrating the preferred method of the present invention.

Having described the apparatus of the present invention hereinabove, the preferred method will now be explained. FIG. 2 depicts a method or algorithm 38 of the present invention. More precisely, FIG. 2 shows a block diagram representing steps performed by the PCM 22 (shown in FIG. 1).

Beginning with step 40, the algorithm 38 determines whether a preferred route is selected or entered, such as by determining whether user-selected starting and ending points describing a preferred route have been entered into the navigation system 24 (see FIG. 1). As indicated hereinabove, the starting point data may be obtained from a GPS system (not shown) or may be manually input into the navigation system 24 (see FIG. 1) by the vehicle operator. The data identifying the ending point of the trip is preferably manually input by the vehicle operator. If starting point and ending point data are not input at step 40, the algorithm 38 defaults to step 52 and implements a more conventional "charge sustaining strategy" or mode, as will be defined in more detail hereinafter. Otherwise, the algorithm 38 proceeds to step 42.

At step 42, the route data is received by the PCM 22 (see FIG. 1) and recorded in memory 26. The algorithm 38 then proceeds to step 44.

At step 44, the algorithm 38 selects an optimal route and develops a powertrain control strategy. There may be a correlation between these two objectives, such that the selection of an optimal route may impact the powertrain control strategy and vice versa. The optimal route and powertrain control strategy are therefore preferably selected together based on received or monitored "look ahead" data as previously described hereinabove, for example from the real-time traffic sources 28, vehicle data from the vehicle sensors 30, and/or map or topographical information stored or recorded in memory device 26 (see FIG. 1). The selected or determined optimal route is preferably conveyed to the vehicle operator via the navigation system 24 (see FIG. 1).

According to the preferred embodiment, the powertrain control strategy of step 44 operates the hybrid vehicle 10 (shown in FIG. 1) in a "charge-depleting mode". For purposes of the present invention, a "charge-depleting mode" is a mode wherein the vehicle 10 is powered primarily by the electric motor/generator 16 such that the battery 18 is fully depleted or nearly depleted when the vehicle 10 reaches its destination. In other words, during the charge-depleting mode, the engine 12 is only operated to the extent necessary to ensure that the battery 18 is not fully depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle 10 can conserve some or all of the fuel that would otherwise be expended to maintain the 25% battery charge level in a conventional hybrid vehicle. It should be appreciated that the vehicle 10 is preferably only operated in the charge-depleting mode if the battery 18 can be recharged after the destination is reached by plugging it into an energy source (not shown).

According to an alternate embodiment, the powertrain control strategy of step 44 operates the engine 12 (see FIG. 1) using homogeneous charge compression ignition, or HCCI. As is known by those skilled in the art, HCCI is an efficient operational mode wherein an internal combustion engine generates pressure to automatically ignite the combustion gasses (i.e., without a spark). Additional engine 12 operational modes configured to improve efficiency and fuel economy may also be envisioned. For example, alternate engine 12 operational modes may include current baseline combustion technology such as port fuel injection, as well as other advanced combustion strategies such as variable valve actuation (VVA), active fuel management (also known as displacement on demand or cylinder deactivation), direct injection, or variable compression ratio.

According to another alternate embodiment, the powertrain control strategy of step 44 operates the engine 12 using various types of fuel to improve the efficiency and fuel economy of a particular application. Such fuels may include, for example, gasoline or diesel, or may include alternative fuels such as ethanol or dimethyl ether. Once an optimal route is selected and a powertrain control strategy is determined in step 44, the algorithm 38 proceeds to step 46.

At step 46, algorithm 38 executes the powertrain control strategy developed in step 44. More precisely, the PCM 22 (see FIG. 1) controls the engine 12 and the transmission 14, including the electric motor/generator 16 and the battery 18, to power the vehicle 10 in the manner dictated by the powertrain control strategy. The algorithm 38 then proceeds to step 48.

At step 48, the algorithm 38 continuously evaluates route input data including "look ahead" data from the real-time traffic sources 28 (see FIG. 1), and vehicle data from the vehicle sensors 30. This step is implemented to account for new information that was not initially available when the optimal route was selected and the powertrain control strategy was developed. As an example, if the vehicle is traveling along a previously selected optimal route and the PCM 22 receives real-time traffic information indicating that the currently selected route is becoming congested due to a traffic accident, it may be necessary to select an alternate route. The algorithm then proceeds to step 50.

At step 50, the algorithm 38 determines whether the input data of step 48 necessitates a change to the route or the control strategy. If, at step 50, the input data of step 48 does not necessitate a change to the route or the control strategy, the algorithm 38 continues in a loop with step 48 and continuously evaluates the input data. If, at step 50, the evaluated input data of step 48 necessitates a change to the route or the control strategy, the algorithm 38 returns to step 44.

At step 52 (see step 40) the algorithm 38 defaults to a "charge-sustaining mode", as previously described hereinabove. In step 52, the PCM 22 detects or measures the current or present charge level of the battery 18, and compares this current charge level to a stored threshold or minimum battery charge. The algorithm 38 then proceeds to step 54, wherein the PCM 22 executes the default charge-sustaining mode, thereby sustaining the charge level of battery 18 at or above the threshold battery charge level.

While the best modes for carrying out the invention have been described in detail, those familiar with the art to which this invention relates will recognize various alternative designs and embodiments for practicing the invention within the scope of the appended claims.

The invention claimed is:

1. A method for controlling a powertrain of a hybrid vehicle having an engine, a motor/generator, a battery that is rechargeable using at least one of the engine and the motor/generator, and a powertrain control module (PCM) operable for developing a powertrain control strategy for powering the vehicle using at least one of the engine, the motor/generator, and the battery, the method comprising:

determining a current location of the vehicle as a starting point of a preferred route;
recording a user-selected ending point of the preferred route;
processing a set of route information using the PCM to thereby determine an optimally fuel efficient route for reaching the ending point; and
automatically executing the powertrain control strategy over the optimally fuel efficient route;
wherein automatically executing the powertrain control strategy substantially depletes a charge level of the battery as the vehicle travels over the optimally fuel efficient route such that the charge level of the battery is substantially depleted when the vehicle reaches the ending point.

2. The method of claim 1, including a navigation system in communication with the PCM, wherein determining a current location of the vehicle includes manually inputting the starting point into the navigation system.

3. The method of claim 1, including a global positioning system in communication with the PCM, wherein determining a current location of the vehicle includes obtaining the starting point using the global positioning system.

4. The method of claim 1, further comprising receiving topographical information describing the topography of the preferred route, wherein the set of route information includes the topographical information.

5. The method of claim 1, further comprising receiving and evaluating real time traffic information relating to the optimally efficient route, and updating at least one of the optimally fuel efficient route and the powertrain control strategy based on the real time traffic information.

6. The method of claim 1, wherein the powertrain control strategy includes powering the vehicle using the engine via one of homogeneous charge compression ignition, port fuel injection, active fuel management, direct injection strategy, and variable compression ratio strategy.

7. The method of claim 1, wherein the powertrain control strategy includes powering the engine using at least one of ethanol, gasoline, dimethyl ether, and diesel fuel.

8. A method for controlling a powertrain of a hybrid vehicle having an engine, a motor/generator, a battery that is rechargeable using at least one of the engine and the motor/generator, and a powertrain control module (PCM) operable for developing a powertrain control strategy for powering the vehicle using at least one of the engine, the motor/generator, and the battery, the method comprising:

recording an ending point of a preferred route using a vehicle navigation system;
determining an optimally fuel efficient route for reaching the ending point using route information, the route information including real time traffic data and electronic map information; and
executing the powertrain control strategy over the optimally fuel efficient route such that a charge level of the battery is substantially depleted to an approximately zero charge level when the vehicle reaches the ending point.

9. A method for controlling a powertrain of a hybrid vehicle having an engine, a motor/generator, a battery that is rechargeable using at least one of the engine and the motor/generator, and a powertrain control module (PCM) operable for developing a powertrain control strategy for powering the vehicle using at least one of the engine, the motor/generator, and the battery, the method comprising:

determining the presence or absence of a recorded user-selected ending point for a preferred vehicle route;
determining an optimally fuel-efficient route for reaching the ending point based on route information, the route information including at least one of traffic information and topographic information;
executing a charge-depleting powertrain control strategy to thereby reach the ending point by depleting a charge level of the battery to an approximately zero charge level when the recorded user-selected ending point is present; and executing a charge-sustaining powertrain control strategy when the user-selected ending point is absent, the charge-sustaining mode sustaining the charge level of the battery above a minimum threshold charge level.

10. The method of claim 9, wherein the route information includes the traffic data, the method further comprising: continuously evaluating the traffic data, and updating the charge-depleting powertrain control strategy in response to the traffic data.

11. The method of claim 9, wherein the route information includes the topographical information, the method further comprising continuously updating the charge-depleting powertrain control strategy in response to the topographical information.

12. The method of claim 9, wherein the minimal threshold charge level is greater than approximately 25% of a maximum charge level of the battery.

13. The method of claim 9, wherein the powertrain control strategy includes powering the vehicle using the engine via one of homogeneous charge compression ignition, port fuel injection, active fuel management, direct injection strategy, and variable compression ratio strategy.

* * * * *